| (12) | United States Patent | (10) Patent No.: | US 9,007,729 B1 |
|---|---|---|---|
| | Ho et al. | (45) Date of Patent: | Apr. 14, 2015 |

(54) READER SENSOR HAVING A RECESSED ANTIFERROMAGNETIC (AFM) PINNING LAYER

(71) Applicant: HGST Netherlands B.V., Amsterdam (NL)

(72) Inventors: Kuok S. Ho, Redwood City, CA (US); Suping Song, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/265,187

(22) Filed: Apr. 29, 2014

(51) Int. Cl.
*G11B 5/39* (2006.01)

(52) U.S. Cl.
CPC ......................................... *G11B 5/39* (2013.01)

(58) Field of Classification Search
USPC .......................................... 360/324.1, 324.11
See application file for complete search history.

(56) References Cited

U.S. PATENT DOCUMENTS

| 6,724,587 | B2 | 4/2004 | Gill | | |
|---|---|---|---|---|---|
| 7,092,221 | B2 | 8/2006 | Gill | | |
| 7,324,310 | B2 | 1/2008 | Gill | | |
| 8,068,317 | B2 | 11/2011 | Gill | | |
| 8,395,867 | B2 | 3/2013 | Dimitrov et al. | | |
| 8,675,318 | B1 * | 3/2014 | Ho et al. | ................... | 360/324.11 |
| 8,711,528 | B1 * | 4/2014 | Xiao et al. | ................ | 360/324.11 |
| 2012/0134057 | A1 * | 5/2012 | Song et al. | ..................... | 360/319 |
| 2012/0276415 | A1 * | 11/2012 | Sapozhnikov et al. | ........ | 428/831 |
| 2013/0027032 | A1 * | 1/2013 | Gao et al. | ....................... | 324/252 |

OTHER PUBLICATIONS

Nagasaka et al., "CPP-GMR Technology for Future High-Density Magnetic Recording," Fujitsu Science Tech Journal, vol. 42, No. 1, Jan. 2006, pp. 149-157.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

In one embodiment, a read sensor includes an antiferromagnetic (AFM) pinning layer, the AFM pinning layer being recessed from a media-facing surface in an element height direction to a first height, a first antiparallel pinned multilayer (AP1) positioned above the AFM pinning layer and extending beyond the first height to the media-facing surface, a second antiparallel pinned layer (AP2) positioned above the AP1 and extending beyond the first height to the media-facing surface, and a free layer positioned at the media-facing surface above the AP2 and extending from the media-facing surface in the element height direction to a second height, wherein the element height direction is perpendicular to the media-facing surface, wherein the AP1 and the AP2 are not recessed from the media-facing surface, and wherein the AFM, the AP1, and the AP2 extend beyond the free layer in the element height direction beyond the second height.

20 Claims, 10 Drawing Sheets

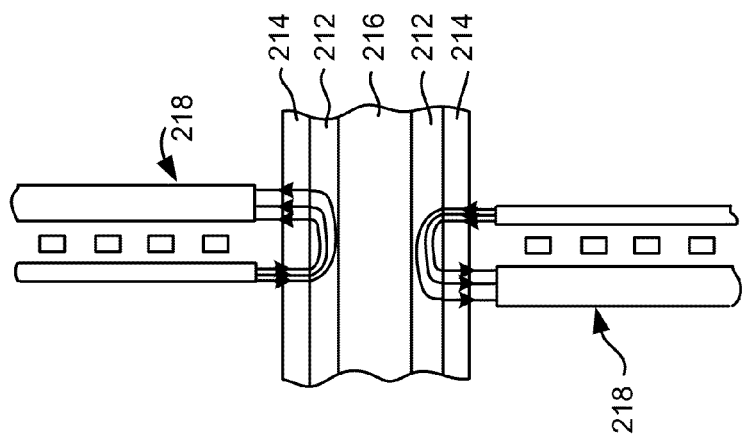
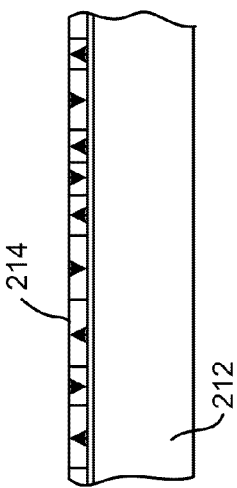
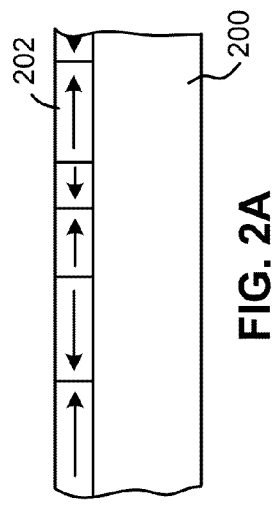
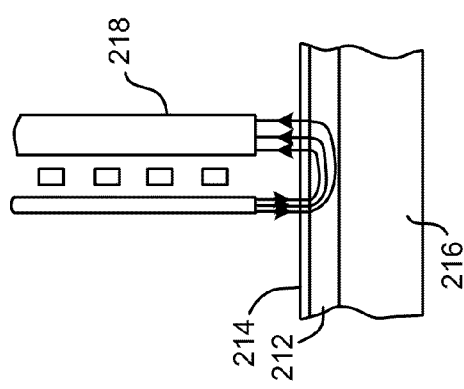
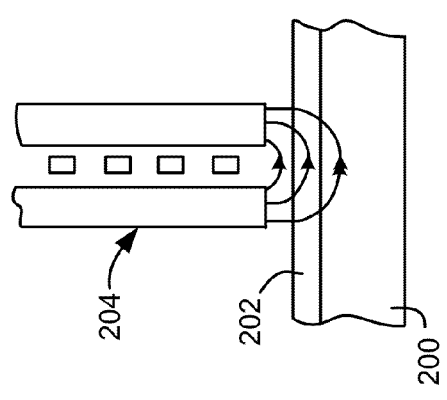

READER SENSOR HAVING A RECESSED ANTIFERROMAGNETIC (AFM) PINNING LAYER

FIELD OF THE INVENTION

The present invention relates to magnetic heads, and more particularly, this invention relates to a magnetic head having a recessed antiferromagnetic (AFM) pinning layer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components. One approach to achieve this reduction in component size is to use a magnetic head with a read sensor that has a narrower track width for use with magnetic media having an increased recording density.

However, one of the problems associated with designing and manufacturing a read sensor having a narrower track width is the size of the read gap. Conventional read sensors are not able to reduce the read gap sufficiently to allow for read sensors with narrower track widths which are able to perform as efficiently as needed.

SUMMARY

In one embodiment, a read sensor includes an antiferromagnetic (AFM) pinning layer configured to pin a magnetic orientation of one or more pinned layers positioned thereon in a predetermined manner, the AFM pinning layer being recessed from a media-facing surface in an element height direction to a first height, a first antiparallel pinned multilayer (AP1) positioned above the AFM pinning layer and extending beyond the first height to the media-facing surface, a second antiparallel pinned layer (AP2) positioned above the AP1 and extending beyond the first height to the media-facing surface, and a free layer configured to respond to magnetic information stored to a magnetic medium, the free layer being positioned at the media-facing surface above the AP2 and extending from the media-facing surface in the element height direction to a second height, wherein the element height direction is perpendicular to the media-facing surface, wherein the AP1 and the AP2 are not recessed from the media-facing surface, and wherein the AFM, the AP1, and the AP2 extend beyond the free layer in the element height direction beyond the second height.

In another embodiment, a method for forming a read sensor includes forming an AFM pinning layer configured to pin a magnetic orientation of one or more pinned layers positioned thereon in a predetermined manner, the AFM pinning layer being recessed from a media-facing surface in an element height direction to a first height, forming an AP1 above the AFM pinning layer and extending beyond the first height to the media-facing surface, forming an AP2 above the AP1 and extending beyond the first height to the media-facing surface, and forming a free layer configured to respond to magnetic information stored to a magnetic medium, the free layer being formed at the media-facing surface above the AP2 and extending from the media-facing surface in the element height direction to a second height, wherein the element height direction is perpendicular to the media-facing surface, wherein the AP1 and the AP2 are not recessed from the media-facing surface, and wherein the AFM, the AP1, and the AP2 extend beyond the free layer in the element height direction beyond the second height.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
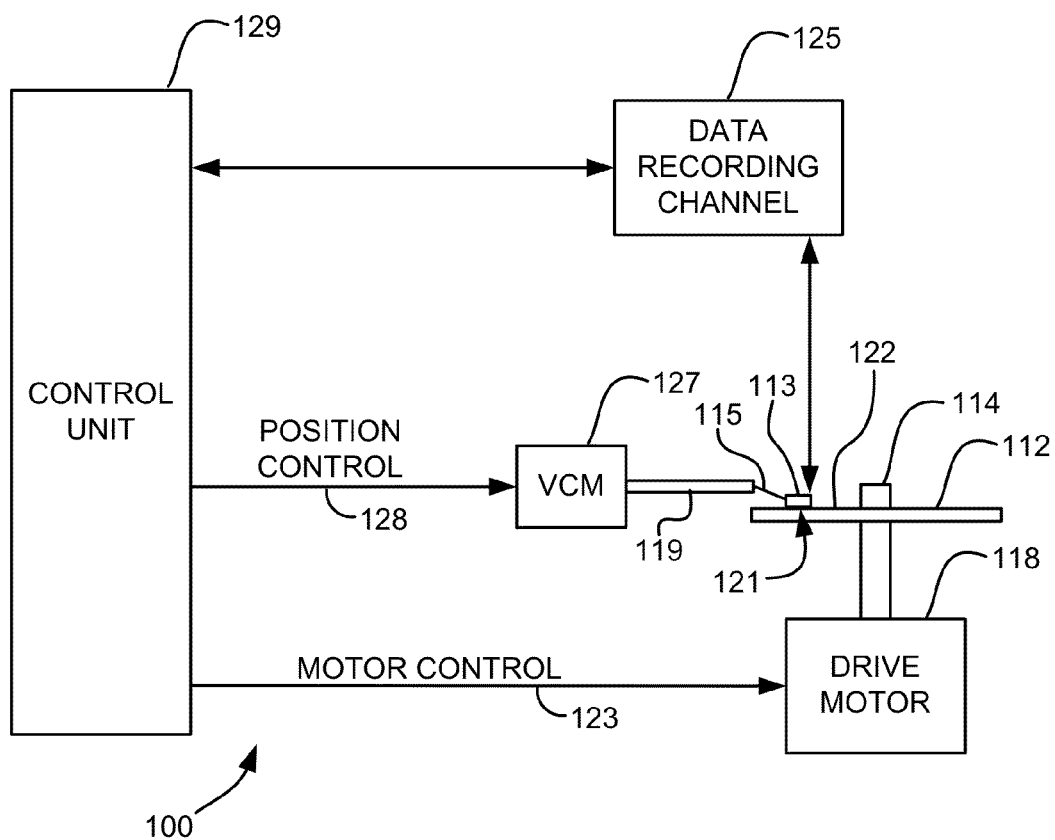
FIG. 1 is a simplified drawing of a magnetic recording disk drive system.

The following description is made for the purpose of illustrating the general principles of the present invention and is not meant to limit the inventive concepts claimed herein. Further, particular features described herein may be used in combination with other described features in each of the various possible combinations and permutations, without necessarily being fixed to one particular embodiment or approach.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one embodiment, a read sensor for use in a magnetic head may be provided with an antiferromagnetic (AFM) pinning layer that is recessed from the media-facing surface of the read sensor. This structure allows for the read gap to be reduced by at least about 4 nm in comparison with conventional structures, along with sufficient amplitude of readback signals and good reliability.

In one general embodiment, a read sensor includes an AFM pinning layer configured to pin a magnetic orientation of one or more pinned layers positioned thereon in a predetermined manner, the AFM pinning layer being recessed from a media-facing surface in an element height direction to a first height, a first antiparallel pinned multilayer (AP1) positioned above the AFM pinning layer and extending beyond the first height to the media-facing surface, a second antiparallel pinned layer (AP2) positioned above the AP1 and extending beyond the first height to the media-facing surface, and a free layer configured to respond to magnetic information stored to a magnetic medium, the free layer being positioned at the media-facing surface above the AP2 and extending from the media-facing surface in the element height direction to a second height, wherein the element height direction is perpendicular to the media-facing surface, wherein the AP1 and the AP2 are not recessed from the media-facing surface, and wherein the AFM, the AP1, and the AP2 extend beyond the free layer in the element height direction beyond the second height.

In another general embodiment, a method for forming a read sensor includes forming an AFM pinning layer configured to pin a magnetic orientation of one or more pinned layers positioned thereon in a predetermined manner, the AFM pinning layer being recessed from a media-facing surface in an element height direction to a first height, forming an AP1 above the AFM pinning layer and extending beyond the first height to the media-facing surface, forming an AP2 above the AP1 and extending beyond the first height to the media-facing surface, and forming a free layer configured to respond to magnetic information stored to a magnetic medium, the free layer being formed at the media-facing surface above the AP2 and extending from the media-facing surface in the element height direction to a second height, wherein the element height direction is perpendicular to the media-facing surface, wherein the AP1 and the AP2 are not recessed from the media-facing surface, and wherein the AFM, the AP1, and the AP2 extend beyond the free layer in the element height direction beyond the second height.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
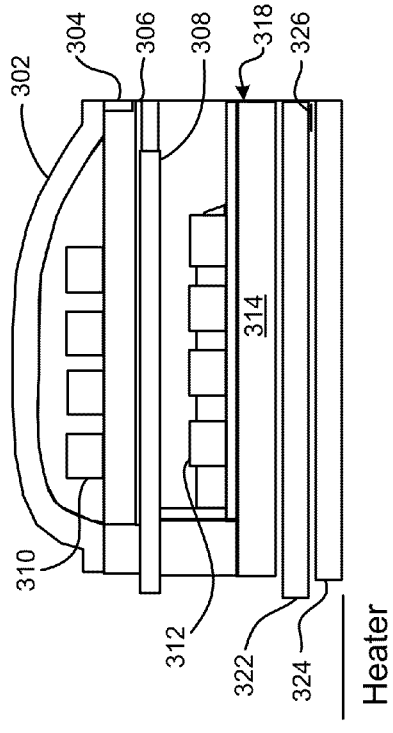
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
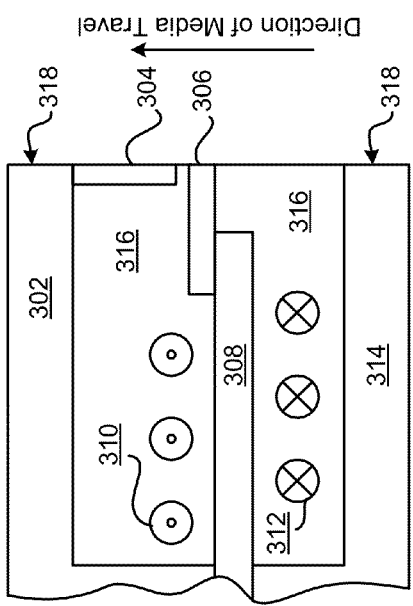
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
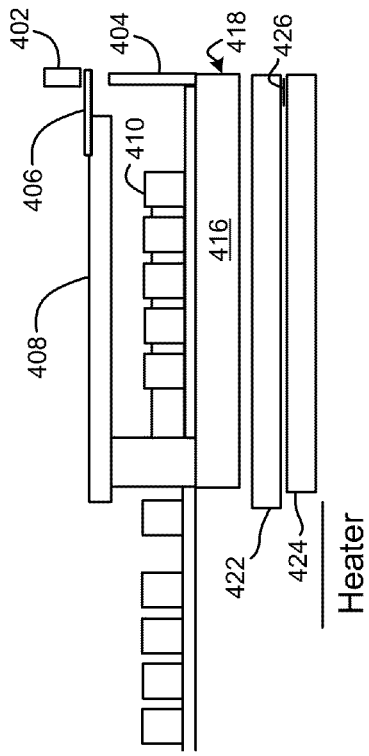
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
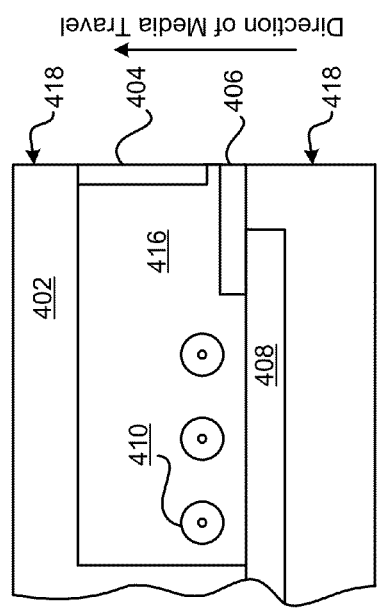
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
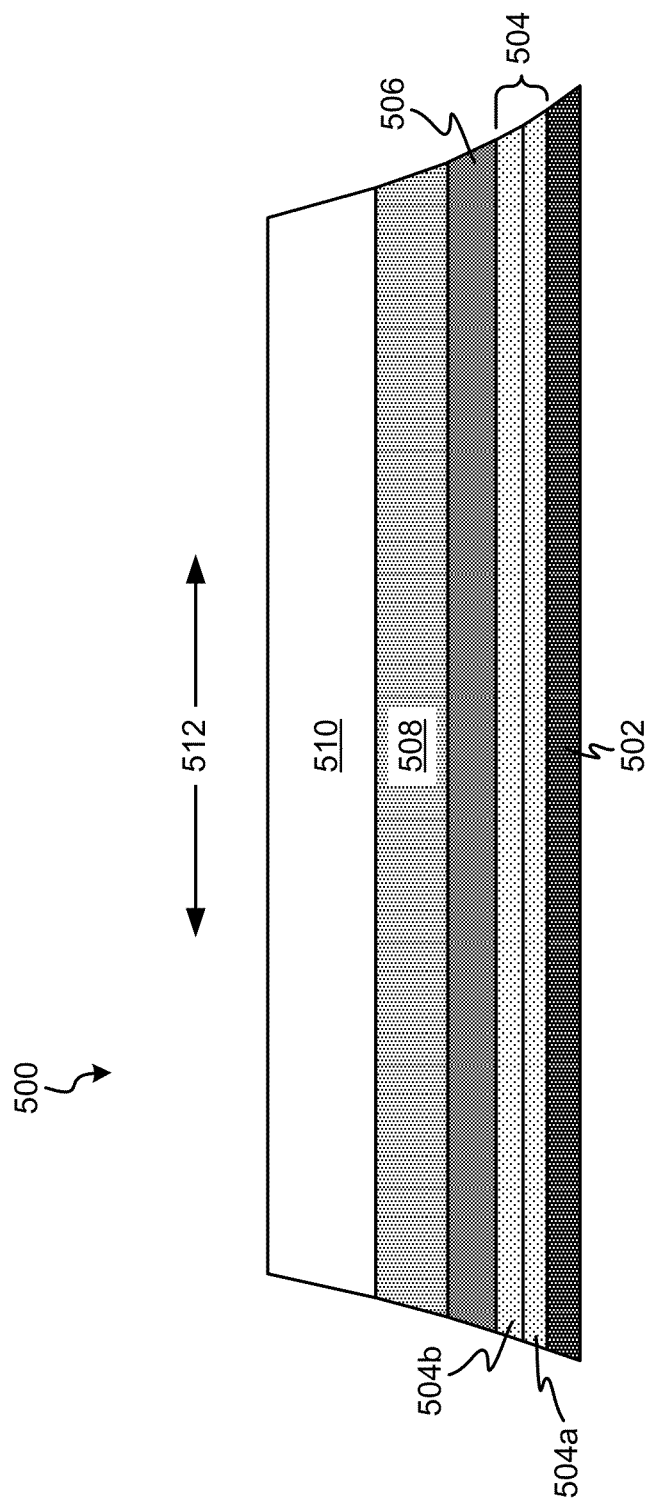
FIG. 5 shows a read sensor as seen from a media-facing surface or air bearing surface (ABS) of the read sensor, according to one embodiment.

FIG. 5 depicts a read sensor 500, in accordance with one embodiment. As an option, the present read sensor 500 may be implemented in conjunction with features from any other embodiment listed herein, such as those described with reference to the other FIGS. Of course, however, such read sensor 500 and others presented herein may be used in various applications and/or in permutations which may or may not be specifically described in the illustrative embodiments listed herein. Further, the read sensor 500 presented herein may be used in any desired environment.

FIG. 5 shows the read sensor 500 as seen from a media-facing surface or air bearing surface (ABS) of the read sensor 500. The read sensor 500 includes, in one embodiment, an AFM pinning layer 502, a first antiparallel pinned multilayer (AP1) 504 positioned above the AFM pinning layer 502, a second antiparallel pinned layer (AP2) 506 positioned above the AP1 504, and a free layer 510 positioned at the media-facing surface above the AP2 506.

In a further embodiment, the read sensor 500 may further include a spacer layer or a barrier layer 508 positioned between the AP2 506 and a full extent of the free layer 510. That is to say, the spacer/barrier layer 508 is present below the free layer 510 across the entirety of the free layer 510 in the element height direction and a cross-track direction 512. In this way, the spacer/barrier layer 508 completely separates the free layer 510 from any other layers therebelow, such as the AP2 506.

When the spacer/barrier layer 508 is used as a spacer, it may comprise any suitable material known in the art, such as nonmagnetic materials like Cu, Al, etc. When the spacer/barrier layer 508 is used as a barrier, it may comprise any suitable material known in the art, such as $Al_2O_3$, Ru, MgO, etc.

The free layer 510 is configured to respond in a recognizable way to magnetic information stored to a magnetic medium. Any type of response to the magnetic information stored to the magnetic medium may be realized, such as increased or decreased resistance, increased or decreased magnetism, increased or decreased temperature, etc., according to sensing techniques known in the art.

In one embodiment, the free layer 510 is positioned at the media-facing surface above the AP2 506 and extends from the media-facing surface in an element height direction to a second height. The element height direction is perpendicular to the media-facing surface.

In another embodiment, the AFM pinning layer 502 is recessed from the media-facing surface in the element height direction to a first height, the AP1 504 and the AP2 506 extend beyond the first height to the media-facing surface, and the AP2 506 extends beyond the first height to the media-facing surface.

Furthermore, the AP1 504 and the AP2 506 are not recessed from the media-facing surface, in one approach. In an alternate approach, these layers may be recessed from the media-facing surface by a distance equal to or less than about 1-5 nm.

In addition, the AFM pinning layer 502, the AP1 504, and the AP2 506 extend beyond the free layer 510 in the element height direction beyond the second height, according to one approach.

The AFM pinning layer 502 is configured to pin a magnetic orientation of one or more pinned layers positioned thereon in a predetermined manner. Any way of pinning the layers may be used, as known in the art. The AFM pinning layer 502 may comprise pure IrMn or an alloy thereof, according to various embodiments, or any other suitable material known in the art.

The side walls of the read sensor 500 may be normal to the cross-track direction 512, or they may be slanted, curved, and/or other than straight. These side walls may be formed and/or influenced by manufacturing processes used to form the various layers, and/or due to desired differences in widths of individual layers at the media-facing surface.

In one embodiment, at least one magnetic shield (not shown) may be positioned near to one or more sides of the free layer 510, as would be known to one of skill in the art.

In one embodiment, the free layer 510, the AP1 504, and the AP2 506 may have a width in the cross-track direction 512 at the media-facing surface in a range of about 20 to about 50 nm, such as about 30 nm to about 35 nm.

According to another embodiment, the AP1 504 may comprise two layers, for example, a first AP1 layer (AP1a) 504a positioned below a second AP1 layer (AP1b) 504b.

FIGS. 6A-6D depict various views of magnetic heads, in accordance with several embodiments. As an option, the magnetic heads may be implemented in conjunction with features from any other embodiment listed herein, such as those described with reference to the other FIGS. Of course, however, such magnetic heads and others presented herein may be used in various applications and/or in permutations which may or may not be specifically described in the illustrative embodiments listed herein. Further, the magnetic heads presented herein may be used in any desired environment.

Now referring to FIGS. 6A-6D, isometric views of portions of various magnetic heads from the media-facing surface 614 thereof are shown according to various embodiments. Each of the magnetic heads comprise a read sensor that comprises, in one embodiment, an AFM pinning layer 602, an AP1 604 positioned above the AFM pinning layer 602, an AP2 606 positioned above the AP1 604, a free layer 610 positioned at the media-facing surface above the AP2 606, and a spacer/barrier layer 608 positioned between the AP2 606 and a full extent of the free layer 610.

Also, in these embodiments, the AP1 604 may include two layers, AP1a 604a and AP1b 604b. These layers may be of about the same shape and size, or they may have different shapes and sizes, in various approaches.

In addition, the AFM pinning layer 602 is recessed from the media-facing surface 614 in the element height direction 616 to a first height 618, the AP1 604 (which may comprise the AP1b 604b and the AP1a 604a) and the AP2 606 may extend beyond the first height 618 to the media-facing surface 614, and the AP2 606 may extend beyond the first height 618 to the media-facing surface 614.

Also, in one embodiment, the free layer 610 is positioned at the media-facing surface 614 above the AP2 606 and extends from the media-facing surface 614 in the element height direction 616 to a second height 620.

In a further embodiment, the first height 618 may be greater than or about equal to the second height 620, as shown in FIGS. 6A-6D. In an alternate embodiment, the first height 618 may be less than the second height 620 such that the free layer 610 is located where at least one of the AP2 606, the AP1 604 (which may comprise the AP1b 604b and the AP1a 604a), and the AFM pinning layer 602 flare to be wider in the cross-track direction 612.

Figure 6A:
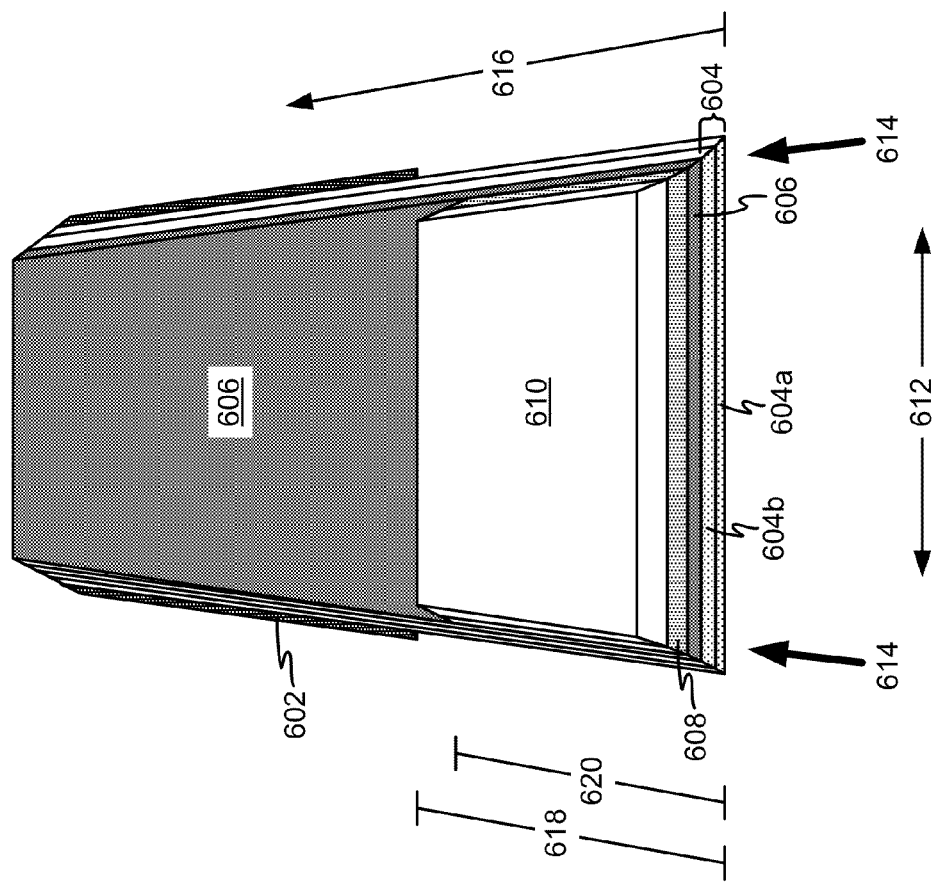
FIGS. 6A-6D show isometric views from the media-facing surface of several read sensor structures according to various embodiments.

As shown in FIG. 6A, the AP2 606, AP1 604 (which may comprise the AP1b 604b and the AP1a 604a), and AFM pinning layer 602 are arranged in a bar shape, where the AFM pinning layer 602 is recessed from the media-facing surface 614, and the other layers (AP2 606, AP1 604) are positioned below the free layer 610 at the media-facing surface 614. Also, the AP2 606, AP1 604 (which may comprise the AP1b 604b and the AP1a 604a), and AFM pinning layer 602 have a width in the cross-track direction 612 that is substantially equal to and/or consistent with the width of the free layer 610 in the cross-track direction.

Figure 6B:
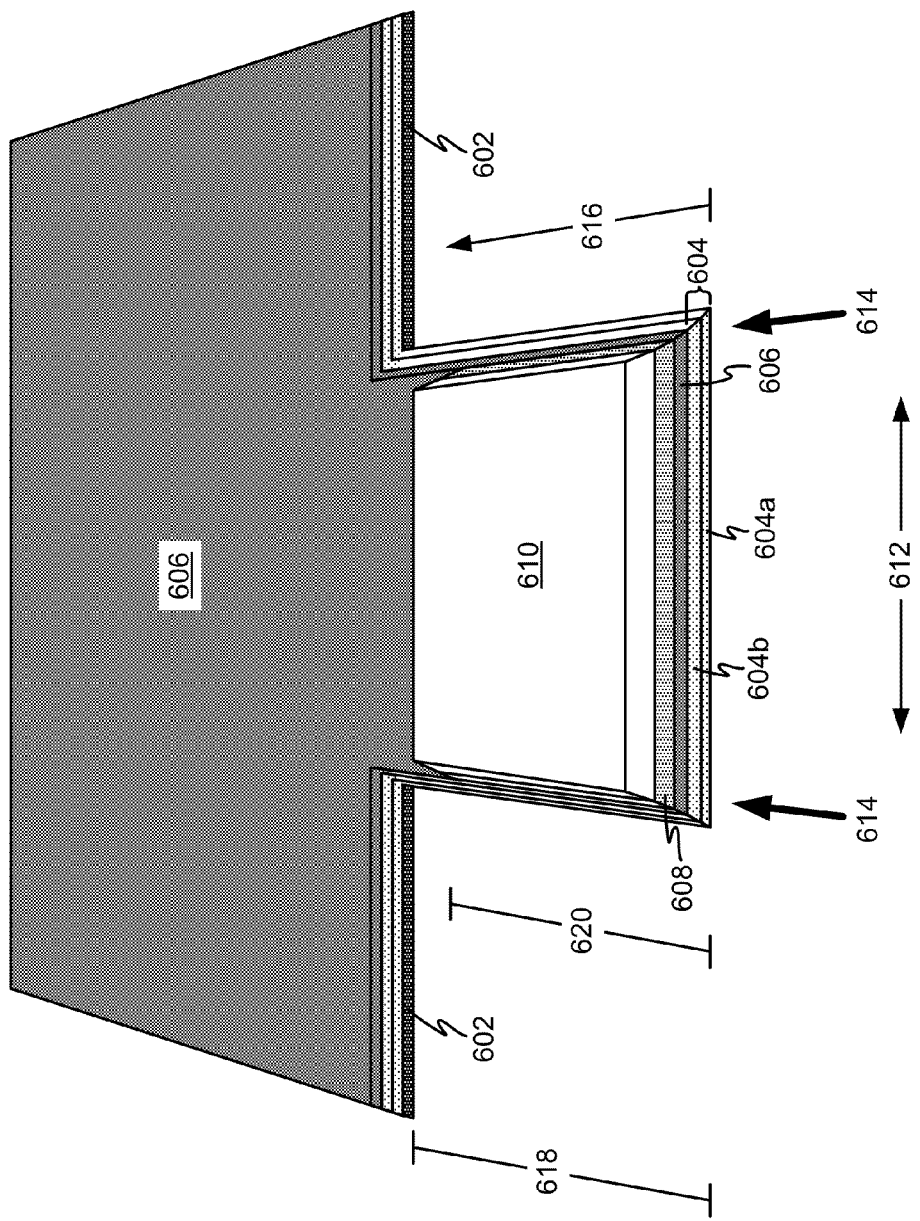

Now referring to FIG. 6B, the AP2 606, the AP1 604 (which may comprise the AP1b 604b and the AP1a 604a), and the AFM pinning layer 602 are arranged in a T-shape. Again, the AFM pinning layer 602 is recessed from the media-facing surface 614, and the other layers (AP2 606, AP1b 604b, AP1a 604a) are positioned below the free layer 610 at the media-facing surface 614. Also, the AP2 606 and AP1 604 (which may comprise the AP1b 604b and the AP1a 604a) have a width in the cross-track direction 612 that is substantially equal to and/or consistent with the width of the free layer 610 in the cross-track direction at the media-facing surface 614, while the AP1 604 (which may comprise the AP1b 604b and the AP1a 604a), AP2 606, and AFM pinning layer 602 at positions above the first height 618, extend in the cross-track direction 612 beyond both sides of the free layer 610, such as by more than about 5 nm in each direction.

In this structure, the AP2 606, at positions above the first height 618, extends in the cross-track direction 612 beyond both sides of the free layer 610 by more than about 5 nm in each direction. Furthermore, the AFM pinning layer 602 is deposited only on the wider portion, and the free layer 610 (and spacer/barrier layer 608 when present) are deposited only on the narrower portion. The AP1 604 (which may comprise the AP1b 604b and the AP1a 604a) and the AP2 606 are deposited on both the wider and narrower portion.

Figure 6C:
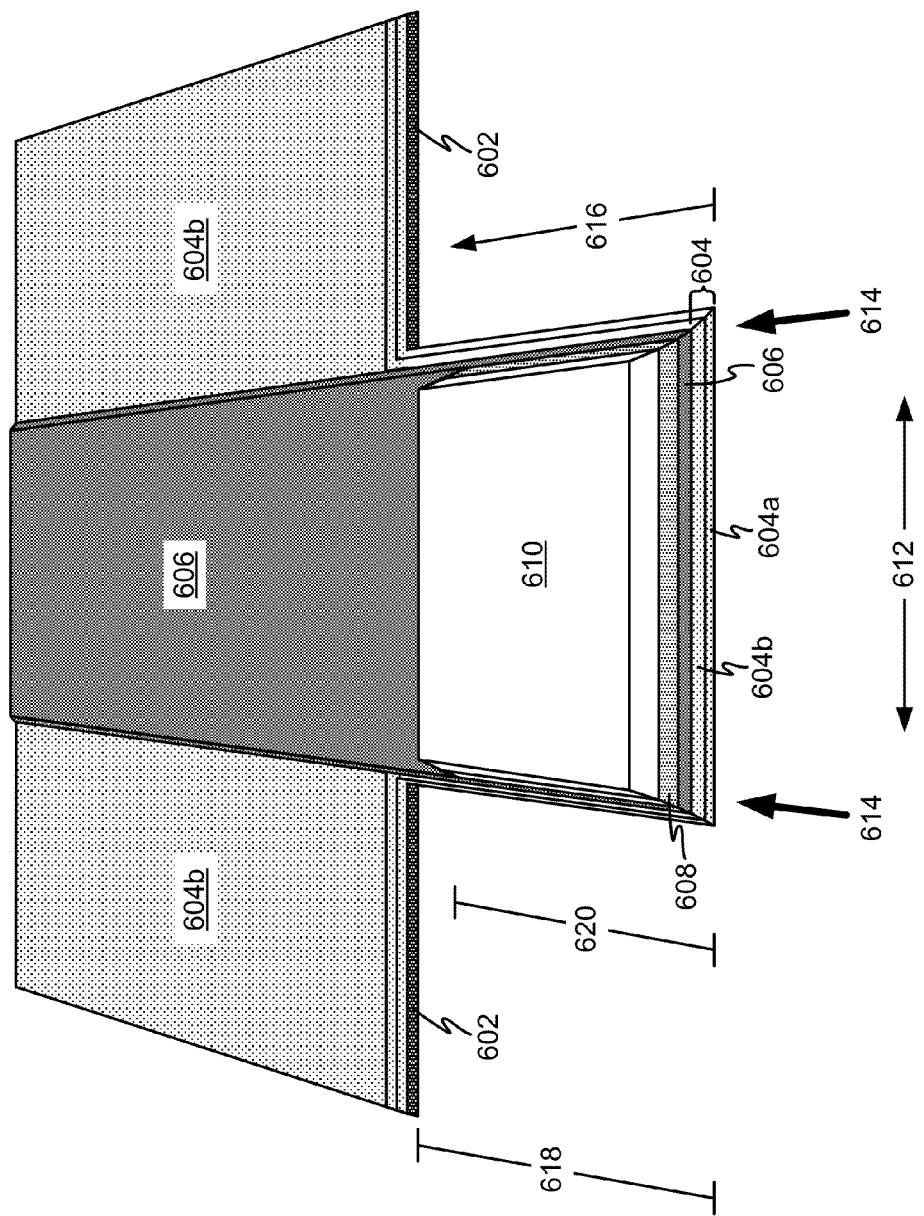

Now referring to FIG. 6C, the AP2 606 is arranged in the bar shape, while the AP1 604 (which may comprise the AP1b 604b and the AP1a 604a) and the AFM pinning layer 602 are arranged in the T-shape. Again, the AFM pinning layer 602 is recessed from the media-facing surface 614, and the other layers (AP2 606, AP1b 604b, AP1a 604a) are positioned below the free layer 610 at the media-facing surface 614. Also, the AP2 606 and AP1 604 (which may comprise the AP1b 604b and the AP1a 604a) have a width in the cross-track direction 612 that is substantially equal to and/or consistent with the width of the free layer 610 in the cross-track direction at the media-facing surface 614, while the AP1 604 (which may comprise the AP1b 604b and the AP1a 604a) and AFM pinning layer 602 at positions above the first height 618, extend in the cross-track direction 612 beyond both sides of the free layer 610, such as by more than about 5 nm in each direction. Meanwhile, the AP2 606 has a width in the cross-track direction 612 that is about equal to the width of the free layer 610 in the cross-track direction at the media-facing surface 614.

In this structure, the AP1b 604b, at positions above the first height 618, extends in the cross-track direction 612 beyond both sides of the free layer 610 by more than about 5 nm in each direction.

Figure 6D:
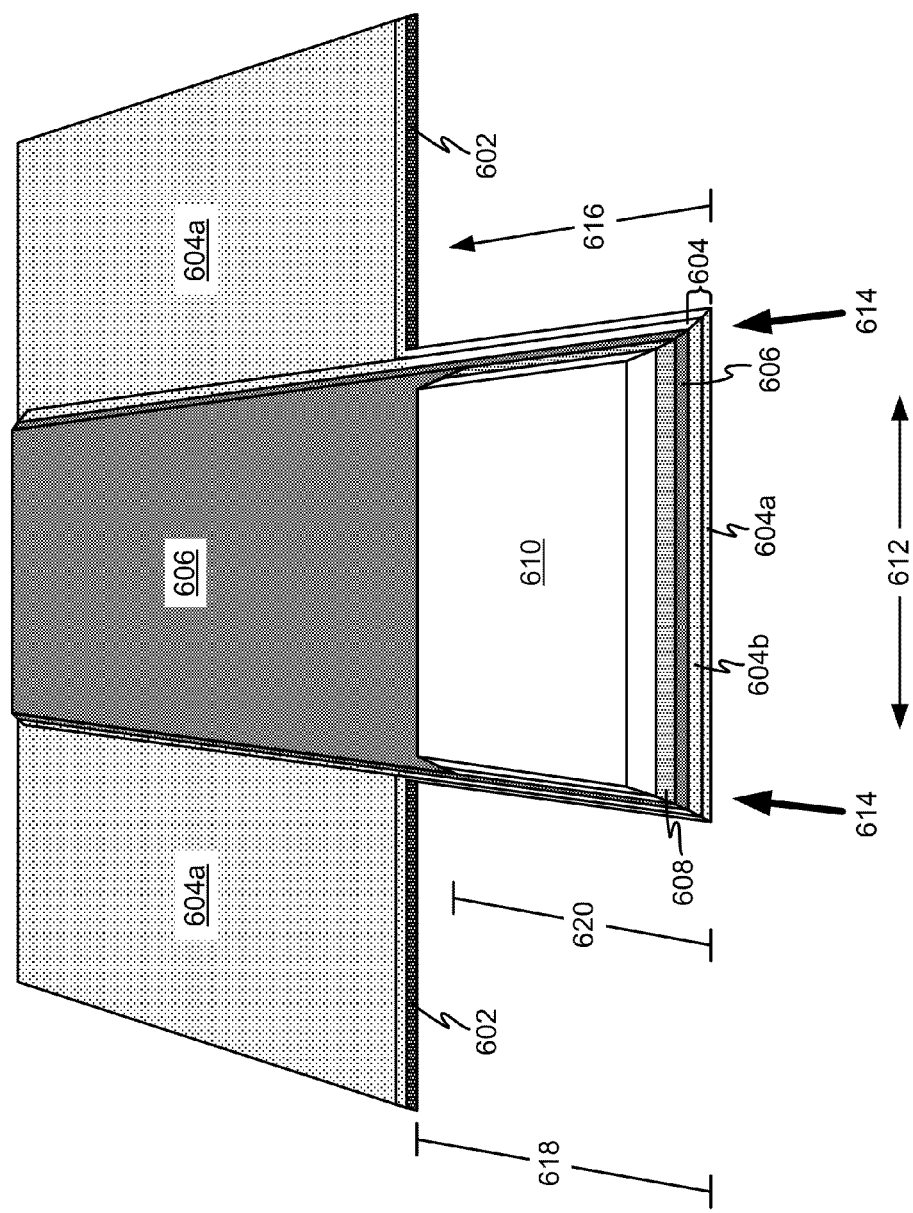

With reference to FIG. 6D, the AP2 606 and the AP1b 604b are arranged in the bar shape, while the AP1a 604a and the AFM pinning layer 602 are arranged in the T-shape. Again, the AFM pinning layer 602 is recessed from the media-facing surface 614, and the other layers (AP2 606, AP1b 604b, AP1a 604a) are positioned below the free layer 610 at the media-facing surface 614. Also, the AP2 606 and AP1 604 (which may comprise the AP1b 604b and the AP1a 604a) have a width in the cross-track direction 612 that is substantially equal to and/or consistent with the width of the free layer 610 in the cross-track direction at the media-facing surface 614, while the AP1a 604a and AFM pinning layer 602 at positions above the first height 618, extend in the cross-track direction 612 beyond both sides of the free layer 610, such as by more than about 5 nm in each direction.

In this structure, the AP1 604 is split into AP1a 604a and AP1b 604b, with the AP1b 604b having the same shape as the AP2 606, while AP1a 604a is deposited on both the wider portion and narrower portions. AP1a 604a and AP1b 604b may comprise the same material or different materials.

In any of the embodiments shown in FIGS. 6A-6D, the wider portion may have straight edges, curved edges, be formed in a T-shape, a Y-shape, or in some other way modified from the structures explicitly shown in the figures as would be understood by one of skill in the art.

It has been found that one advantage of using the T-shape for at least the Ap1a 604a and AFM pinning layer 602 is an observed increase in reliability when compared to the bar shape structure.

Figure 7:
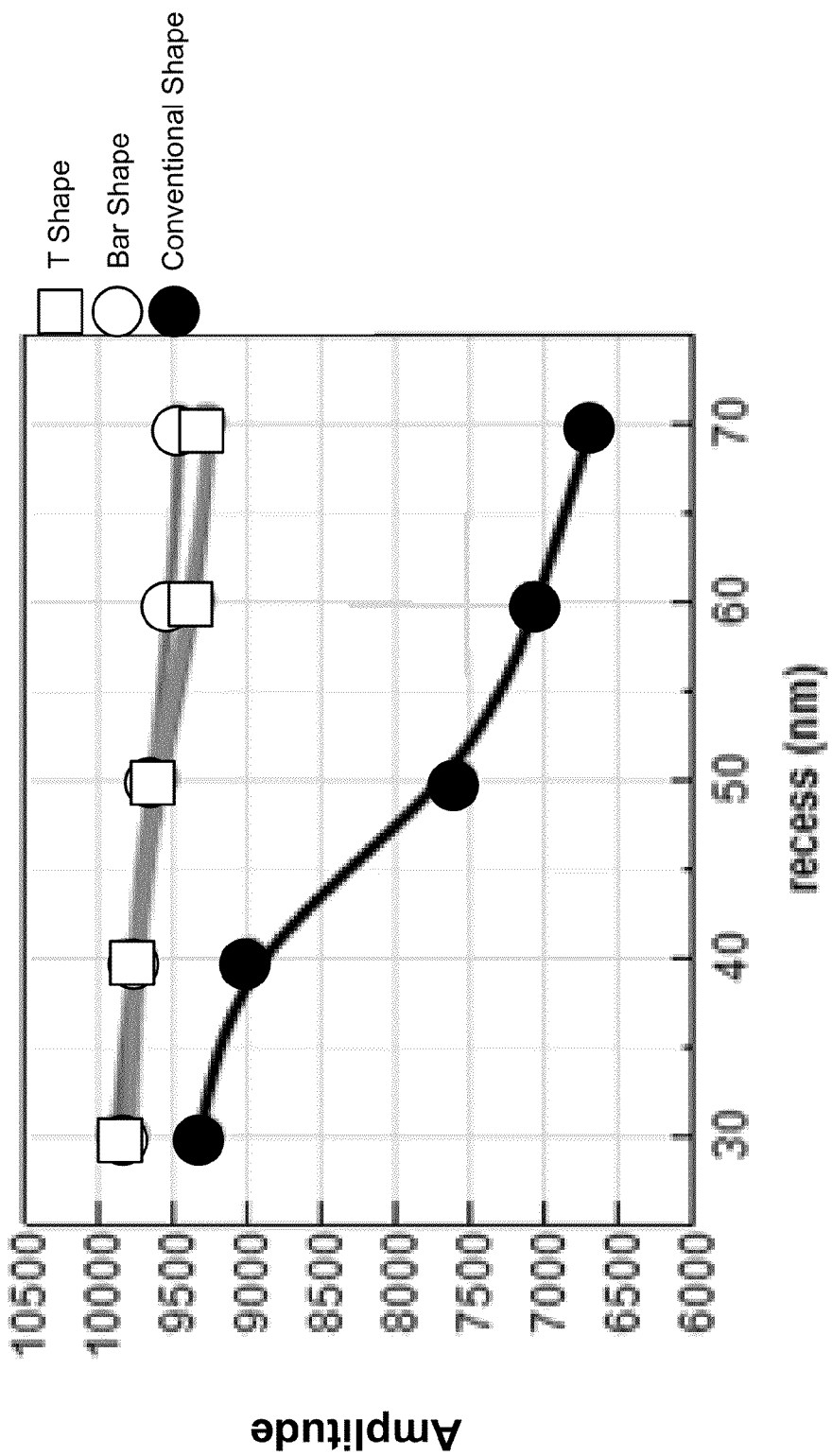
FIG. 7 shows measurements of read sensor structures.

FIG. 7 shows measurements of the read sensor structure according to FIG. 6A and the read sensor structure of FIGS. 6A-6D in comparison with a conventional structure. FIG. 7 shows that the read sensor structures described herein according to various embodiments provide improved reliability in comparison to a conventional structure, particularly at larger recess lengths.

In some approaches, a magnetic head using a read sensor and/or read head as described herein according to various embodiments may be used in a magnetic data storage system. The magnetic data storage system may be similar to that shown in FIG. 1. For example, the magnetic data storage system 100 may comprise at least one magnetic head 121 having a sensor stack as described according to any embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

Figure 8:
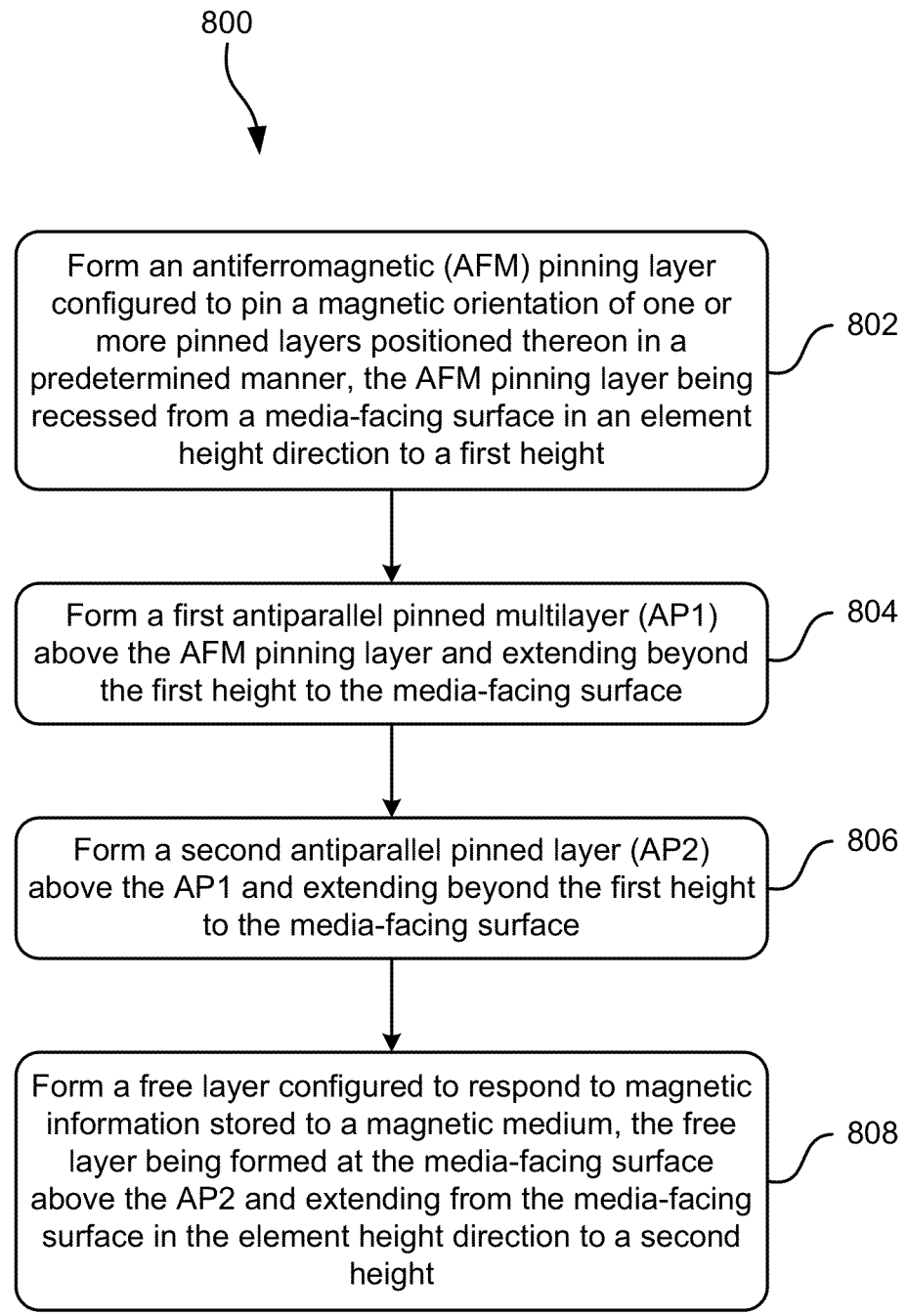
FIG. 8 shows a flowchart of a method according to one embodiment.

FIG. 8 shows a method 800 for forming a read sensor (which may be part of a magnetic head or some other apparatus or device), in accordance with one embodiment. As an option, the present method 800 may be implemented to construct structures such as those shown in FIGS. 1-6D. Of course, however, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods. Of course, more or less operations than those specifically described in FIG. 8 may be included in method 800, as would be understood by one of skill in the art upon reading the present descriptions.

Any formation technique may be used to form any of the layers, structures, films, and other components of method 800 described herein, such as sputtering, plating, spin coating, chemical vapor deposition (CVD), atomic layer deposition (ALD), physical vapor deposition (PVD), etc.

Furthermore, any magnetic (such as alloys of Co, Fe, Ni, and/or Pt, etc.), nonmagnetic (such as Cu, Al, etc.), and/or insulating material (alumina, MgO, $Ta_2O_5$, etc.) may be used, as appropriate, to form the layers described in method 800, or any other suitable materials known in the art.

Of course, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

The method 800 may begin with operation 802, where forming an antiferromagnetic (AFM) pinning layer configured to pin a magnetic orientation of one or more pinned layers positioned thereon in a predetermined manner, the AFM pinning layer being recessed from a media-facing surface in an element height direction to a first height.

In operation 804, forming a first antiparallel pinned multilayer (AP1) above the AFM pinning layer and extending beyond the first height to the media-facing surface In operation 806, forming a second antiparallel pinned layer (AP2) above the AP1 and extending beyond the first height to the media-facing surface.

In operation 808, forming a free layer configured to respond to magnetic information stored to a magnetic medium, the free layer being formed at the media-facing surface above the AP2 and extending from the media-facing surface in the element height direction to a second height.

Furthermore, the element height direction is perpendicular to the media-facing surface, the AP1 and the AP2 are not recessed from the media-facing surface, and the AFM, the AP1, and the AP2 extend beyond the free layer in the element height direction beyond the second height.

Method 800 may further include forming at least one magnetic shield near to one or more sides of the free layer and forming a spacer layer or a barrier layer between the AP2 and a full extent of the free layer. The AFM pinning layer may comprise pure IrMn or an alloy thereof.

In one embodiment, the free layer, the AP1, and the AP2 may be formed to have a width in a cross-track direction at the media-facing surface in a range of about 20-50 nm, such as about 30 nm to about 35 nm. In more approaches, the width of the free layer, the AP1, and the AP2 may be formed to correlate to a track width of a magnetic medium, such as a HDD or some other recording device.

In another embodiment, the first height may be greater than or about equal to the second height. In an alternate embodiment, the first height may be less than the second height.

In yet another embodiment, the AP1 may comprise two layers, AP1a formed below AP1b. In a further embodiment, the AP1a may be formed to extend, at positions above the first height, in a cross-track direction beyond both sides of the free layer by more than about 5 nm in each direction. In another further embodiment, the AP1b may be formed to extend, at positions above the first height, in the cross-track direction beyond both sides of the free layer by more than about 5 nm in each direction. In yet another further embodiment, the AP2 may be formed to extend, at positions above the first height, in the cross-track direction beyond both sides of the free layer by more than about 5 nm in each direction. In any of these embodiments, the AP1a, AP1b, and/or AP2 may have about the same width at the media-facing surface, while having the same or different widths above the first height, as described above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A read sensor, comprising:
   an antiferromagnetic (AFM) pinning layer configured to pin a magnetic orientation of one or more pinned layers positioned thereon in a predetermined manner, the AFM pinning layer being recessed from a media-facing surface in an element height direction to a first height;
   a first antiparallel pinned multilayer (AP1) positioned above the AFM pinning layer, each layer thereof extending beyond the first height to the media-facing surface;
   a second antiparallel pinned layer (AP2) positioned above the AP1 and extending beyond the first height to the media-facing surface; and
   a free layer configured to respond to magnetic information stored to a magnetic medium, the free layer being positioned at the media-facing surface above the AP2 and extending from the media-facing surface in the element height direction to a second height,
   wherein the element height direction is perpendicular to the media-facing surface,
   wherein each layer of the AP1 and the AP2 is not recessed from the media-facing surface, and
   wherein the AFM, the AP1, and the AP2 extend beyond the free layer in the element height direction beyond the second height.

2. The read sensor as recited in claim 1, further comprising:
   at least one magnetic shield positioned near to one or more sides of the free layer; and
   a spacer layer positioned between the AP2 and a full extent of the free layer,
   wherein the AFM pinning layer comprises pure IrMn or an alloy thereof, and
   wherein the spacer layer comprises at least one of: Cu and Al.

3. The read sensor as recited in claim 1, wherein the free layer, the AP1, and the AP2 have a width in a cross-track direction at the media-facing surface in a range of about 30 nm to about 35 nm.

4. The read sensor as recited in claim 1, wherein the first height is greater than or about equal to the second height.

5. The read sensor as recited in claim 1, wherein the first height is less than the second height.

6. A magnetic data storage system, comprising:
   at least one magnetic head comprising a read sensor as recited in claim 1;
   a magnetic medium;
   a drive mechanism for passing the magnetic medium over the at least one magnetic head; and
   a controller electrically coupled to the at least one magnetic head for controlling operation of the at least one magnetic head.

7. The read sensor as recited in claim 1, wherein the AP1 comprises two layers, a first AP1 layer (AP1a) positioned below a second AP1 layer (AP1b), wherein both AP1a and AP1b extend to the media facing surface.

8. The read sensor as recited in claim 7, wherein the AP1a, at positions above the first height, extends in a cross-track direction beyond both sides of the free layer by more than about 5 nm in each direction, and wherein the AP1b and the AP2 do not extend in the cross-track direction beyond the free layer on either side.

9. The read sensor as recited in claim 7, wherein the AP1a and the AP1b, at positions above the first height, each extends in the cross-track direction beyond both sides of the free layer by more than about 5 nm in each direction.

10. The read sensor as recited in claim 9, wherein the AP2, at positions above the first height, extends in the cross-track direction beyond both sides of the free layer by more than about 5 nm in each direction.

11. A method for forming a read sensor, the method comprising:
    forming an antiferromagnetic (AFM) pinning layer configured to pin a magnetic orientation of one or more pinned layers positioned thereon in a predetermined manner, the AFM pinning layer being recessed from a media-facing surface in an element height direction to a first height;
    forming a first antiparallel pinned multilayer (AP1) above the AFM pinning layer, each layer thereof extending beyond the first height to the media-facing surface;
    forming a second antiparallel pinned layer (AP2) above the AP1 and extending beyond the first height to the media-facing surface; and
    forming a free layer configured to respond to magnetic information stored to a magnetic medium, the free layer being formed at the media-facing surface above the AP2 and extending from the media-facing surface in the element height direction to a second height,
    wherein the element height direction is perpendicular to the media-facing surface,
    wherein each layer of the AP1 and the AP2 is not recessed from the media-facing surface, and
    wherein the AFM, the AP1, and the AP2 extend beyond the free layer in the element height direction beyond the second height.

12. The method as recited in claim 11, further comprising:
    forming at least one magnetic shield near to one or more sides of the free layer; and forming a spacer layer or a barrier layer between the AP2 and a full extent of the free layer, wherein the AFM pinning layer comprises pure IrMn or an alloy thereof.

13. The method as recited in claim 11, wherein the free layer, the AP1, and the AP2 are formed to have a width in a cross-track direction at the media-facing surface in a range of about 30 nm to about 35 nm.

14. The method as recited in claim 11, wherein the first height is greater than or about equal to the second height.

15. The method as recited in claim 11, wherein the first height is less than the second height.

16. The method as recited in claim 11, wherein the AP1 comprises two layers, a first AP1 layer (AP1a) formed below a second AP1 layer (AP1b), wherein both AP1a and AP1b extend to the media facing surface.

17. The method as recited in claim 16, wherein the AP1a is formed to extend, at positions above the first height, in a cross-track direction beyond both sides of the free layer by more than about 5 nm in each direction, and wherein the AP1b and the AP2 are formed to not extend in the cross-track direction beyond the free layer on either side.

18. The method as recited in claim 16, wherein the AP1a and the AP1b are each formed to extend, at positions above the first height, in the cross-track direction beyond both sides of the free layer by more than about 5 nm in each direction.

19. The method as recited in claim 18, wherein the AP2 is formed to extend, at positions above the first height, in the cross-track direction beyond both sides of the free layer by more than about 5 nm in each direction.

20. A read sensor, comprising:

an antiferromagnetic (AFM) pinning layer, the AFM pinning layer being recessed from a media-facing surface in an element height direction to a first height;

a first antiparallel pinned multilayer (AP1) positioned above the AFM pinning layer and extending beyond the first height to the media-facing surface;

a second antiparallel pinned layer (AP2) positioned above the AP1 and extending beyond the first height to the media-facing surface; and a free layer positioned at the media-facing surface above the AP2 and extending from the media-facing surface in the element height direction to a second height, wherein the element height direction is perpendicular to the media-facing surface, wherein the AP1 and the AP2 are not recessed from the media-facing surface, wherein the AFM, the AP1, and the AP2 extend beyond the free layer in the element height direction beyond the second height, and wherein the AP2, at positions above the first height, extends in a cross-track direction beyond both sides of the free layer by more than about 5 nm in each direction.

* * * * *

UNITED STATES PATENT AND TRADEMARK OFFICE
CERTIFICATE OF CORRECTION

PATENT NO. : 9,007,729 B1
APPLICATION NO. : 14/265187
DATED : April 14, 2015
INVENTOR(S) : Ho et al.

Page 1 of 1

It is certified that error appears in the above-identified patent and that said Letters Patent is hereby corrected as shown below:

In the claims:

col. 12, line 32 claim 9 replace "extends" with --extend--.

Signed and Sealed this
Twenty-ninth Day of December, 2015

Michelle K. Lee
*Director of the United States Patent and Trademark Office*